(12) United States Patent
Jansen

(10) Patent No.: US 7,464,722 B2
(45) Date of Patent: Dec. 16, 2008

(54) FLUID PROPORTIONING VALVE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 261 days.

(21) Appl. No.: 11/462,926

(22) Filed: Aug. 7, 2006

(65) Prior Publication Data

US 2007/0028965 A1   Feb. 8, 2007

Related U.S. Application Data

(60) Provisional application No. 60/746,571, filed on May 5, 2006, provisional application No. 60/706,156, filed on Aug. 5, 2005.

(51) Int. Cl.
*F16K 15/02* (2006.01)

(52) U.S. Cl. .................. 137/508; 137/454.2; 137/496

(58) Field of Classification Search ............... 137/496, 137/508, 538, 542, 543.13, 454.2, 543.15
See application file for complete search history.

(56) References Cited

U.S. PATENT DOCUMENTS 2,655,173 A * 10/1953 Overbeke ................ 137/469
3,103,950 A * 9/1963 Gulick ..................... 137/494
3,292,656 A * 12/1966 Armstrong ................ 137/480
4,176,680 A * 12/1979 de Launay ................ 137/496
4,256,137 A * 3/1981 de Launay ................ 137/496
4,648,424 A * 3/1987 Takahashi et al. .......... 137/504
6,390,129 B2   5/2002 Jansen et al.
6,474,359 B1 * 11/2002 Smith, III ................ 137/493.9
2005/0097880 A1   5/2005 Jansen

* cited by examiner

*Primary Examiner*—Stephen M Hepperle
(74) *Attorney, Agent, or Firm*—Quarles & Brady LLP

(57) ABSTRACT

A fluid proportioning valve meters flow of pressurized inlet fluid in proportion to a pressure drop between the inlet and outlet of the valve. A pressure acutated, return biased poppet valve is actuated by the fluid above threshold fluid pressure to meter fluid to the outlet against spring force. The poppet is annular and has a circular metering edge that controls flow through circumferential orifices in a valve guide. Smooth stable flow is achieved by shearing action of the metering edge over the orifices. Sliding point contact with the poppet valve by non-ferrous convex buttons to eliminate galling and reduce particle contamination within the valve.

15 Claims, 2 Drawing Sheets

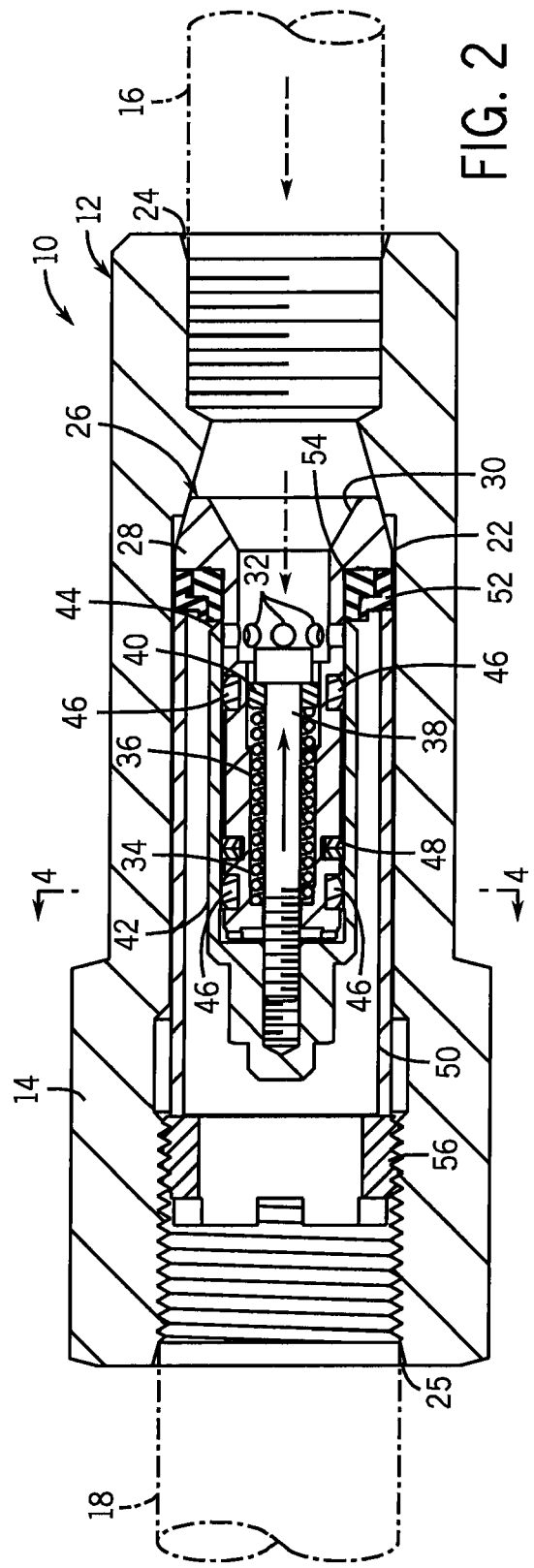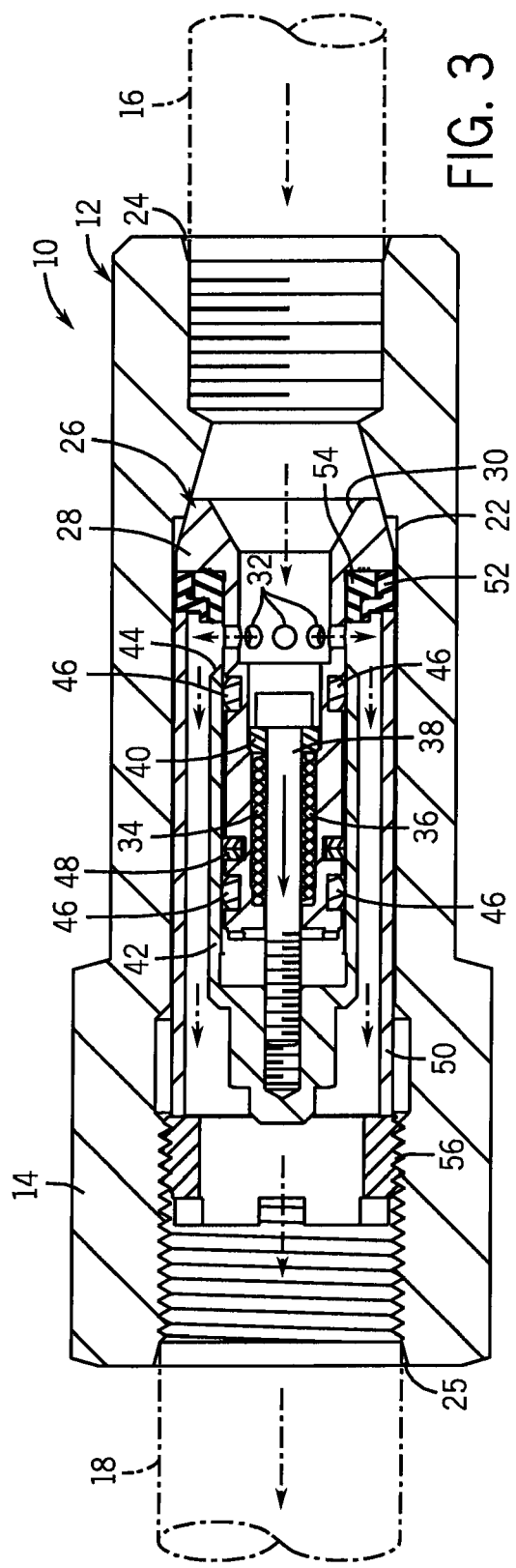

FLUID PROPORTIONING VALVE

CROSS-REFERENCE TO RELATED APPLICATIONS

This application claims benefit to U.S. provisional application Ser. No. 60/706,156, filed Aug. 5, 2005 and U.S. provisional application Ser. No. 60/746,571, filed May 5, 2006.

STATEMENT OF FEDERALLY SPONSORED RESEARCH OR DEVELOPMENT

Not applicable.

BACKGROUND OF THE INVENTION

1. Technical Field

The present invention relates to valves, and in particular, to proportional valves in which the output flow is proportional to the pressure drop across the valve.

2. Description of the Related Art

Modern gas turbines used in the generation are very large and capable of a continuous power output between 200-500 megawatts. Such high output requires significant fuel consumption on the order of 200-400 gallons per minute. Water can be injected into the combustion chambers to reduce emissions from the turbine. Water injection also serves to increase maximum power output of the turbine by increasing mass flow through the turbine. Water flow is injected at flow rates comparable to the fuel flow rates.

Given the high flow requirements of large industrial turbine systems, the proper operation of the metering valves used to control water injection is critical. Failure of the metering valve can lead to the turbine tripping off-line. Tripping off-line can be harmful to the moving elements of the turbine and leaves the turbine inoperable for lengthy periods while the problem is addressed and the turbine is brought back on-line. Power output of the plant is diminished during the entire period the turbine is off-line.

Problems are encountered with existing metering valves with respect to valve stability, leakage and particle contamination, among other things. The high flow rate environment in which the valve operates gives rise to high flow forces acting on the metering member of the valve. These flow forces acting on the metering member can cause disruptions or slight position changes of the metering edge at the interface with the metering orifice(s). This "chatter" in turn leads fluctuations in the metered flow and thereby transient or sustained instability. The high flow rates and flow forces can also cause seal failure resulting in valve leakage. Since the valve is used to inject water into the combustion chamber of the turbine, which is typically at elevated pressures, valve leakage can permit back pressure to restrict or back up flow from the water system. Valve operation can also be adversely affected by the build up of particles in the flow path. Close tolerances and sliding metal-to-metal contact can cause either the metering member or the seat, or both, to wear and introduce particles into the internal areas of the valve. In addition to causing galling, these particles can impair movement of the metering member or disturb the metering edge/orifice interface. All of these things impact valve operation and can lead to untimely turbine shut-down and thereby loss of plant power output.

Accordingly, an improved valve is needed for use in water injection into the combustion areas of gas turbines, particularly large industrial turbines used for power generation.

SUMMARY OF THE INVENTION

The present invention provides a fluid proportioning valve for metering flow of pressurized fluid in proportion to the pressure drop between the inlet and outlet of the valve. Various features of the valve provide for highly stable metering and low leakage and make it highly resistant to material contamination and galling of the metering element with minimal parasitic pressure losses. Operational parameters of the valve are easily adjusted by changing the return force member, and the valve assembly can be in a cartridge form to allow for quick assembly into the main housing and changing of valve assemblies of different operational parameters.

Specifically, in one aspect the invention provides a fluid proportioning valve having a valve housing with an inlet port, an outlet port and a valve cavity between the inlet and outlet ports. A valve guide is disposed in the valve cavity which has an inlet in communication with the inlet port of the valve housing and an orifice in communication with the inlet. The valve guide has a cavity containing a return spring. About the valve guide is a metering valve having a metering edge controlling flow through the valve guide orifice. A coupler joins the metering valve to the valve guide so as to permit relative movement of the metering valve with respect to the valve guide along a valve axis. The metering edge of the metering valve can thus change position with respect to the valve guide orifice to deliver from the outlet port pressurized fluid from the inlet port in proportion to a pressure drop between the inlet and outlet ports.

The valve can be flow pressure activated with spring return. In particular, the metering valve can be an inverted spool type annular poppet valve that fits about the annular body of the valve guide. For example, the valve can be cylindrical with a circular cross-section and a circular metering edge, preferably being tapered in the direction of the inlet flow. The metering edge thus shears the across the metered flow stream so that the metering valve is essentially insensitive to flow forces, thereby providing highly stable metering and valve operation.

The valve guide can define a plurality of the orifices in communication with the valve guide inlet. The valve orifices are spaced apart along a circumference of the valve guide. Multiple, small valve orifices reduces local flow forces on the valve metering edge, reducing valve chatter and improving stability.

The valve components internal to the housing are essentially in cartridge form. The valve guide has an enlarged section mating with an interior surface of the valve housing defining the valve cavity so that the valve guide extends along the valve axis. A retaining sleeve mates with the enlarged section of the valve guide and a retaining nut secures sleeve, and thereby the valve guide, within the valve housing. By simply removing the nut, the entire valve assembly can be removed from the housing as a cartridge or package assembly. Thus, the internal components of the valve can be replaced with another assembly of the same or different operation parameters.

Using a spring of a different spring rate or turn count allows for simple pressure crack adjustment of the valve. Moreover, spring resonance interaction with the flow media is avoided by isolating the spring from the flow media.

In another aspect, the invention provides a fluid proportioning valve having a fluid pressure actuated, return biased poppet valve that is coupled to and slides with respect to the valve guide along a plurality of buttons mounted between the valve guide and the poppet valve. Each button provides sliding point contact between the poppet valve and the valve guide by virtue of a convex, even spherical, mating surface extending between the clearance between the valve guide and the poppet valve. The buttons can be fixed with respect to the valve guide, and are preferably of a non-ferrous alloy material, such as a suitable plastic.

The valve thus maximizes the clearance between the sliding poppet valve and the stationary valve guide. The buttons also prevent sliding surface contact as well as metal-to-metal contact between the poppet valve and the valve guide. This eliminates galling and improves resistance to particle contamination of the flow stream. The smooth contour flow path through the valve further reduces particle contamination by reducing air pockets where particles can build up.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

BRIEF DESCRIPTION OF THE DRAWINGS

FIG. 2 is a sectional view taken along line 2-2 of FIG. 1 showing the valve in a closed state;

FIG. 3 is a sectional view similar to FIG. 2 albeit showing the vale in a fully open state.

DETAILED DESCRIPTION OF THE PREFERRED EMBODIMENT

Figure 1:
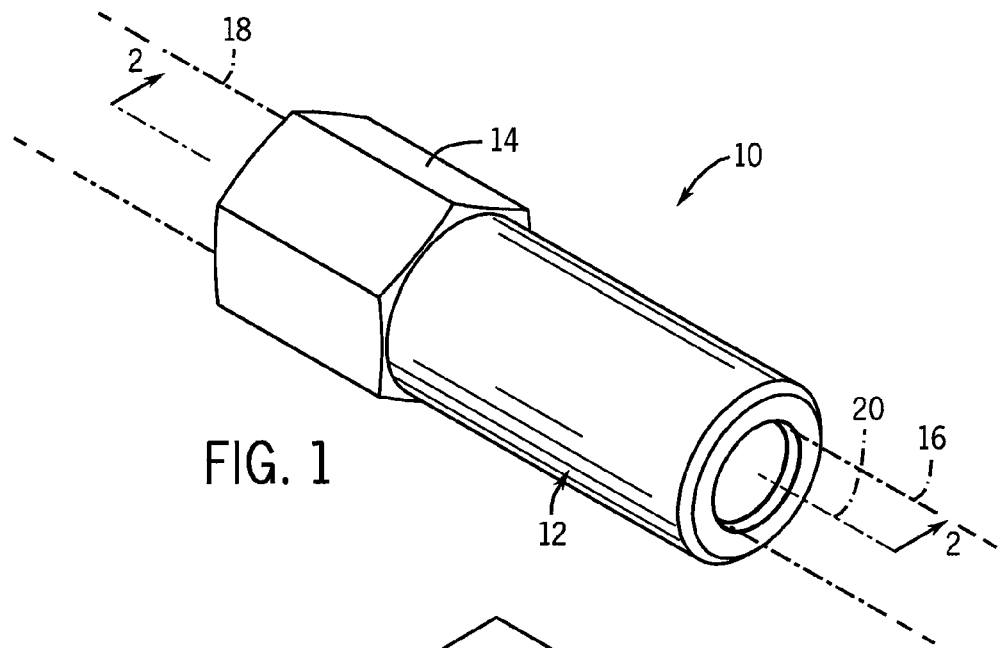
FIG. 1. is a perspective view of a fluid proportioning valve according to the present invention.

FIG. 1 shows a preferred version of the proportioning valve 10 of the present invention. The proportioning valve 10 has an annular housing 12 with an external hex section 14 for application of tooling when assembling the proportioning valve 10 inlet 16 and outlet 18 lines (shown in phantom in FIGS. 1 and 2). The valve housing 12 extends about and along valve axis 20 and defines an internal valve cavity 22 in communication with an inlet port 24 and an outlet port 25. Both ports are threaded internally, and the valve cavity 22 has a partial conical section that tapers inwardly to the inlet port 24.

As shown in FIGS. 2 and 3, the valve cavity 22 contains the internal working components of the proportioning valve 10. The internal components are packaged as a compact cartridge assembly for ease of installation and so that the operational parameters of the valve can be changed simply by swapping one cartridge assembly with another.

In particular, the cartridge assembly includes a valve guide 26. The valve guide 26 has an enlarged nose 28, the outer periphery of which fits against an inner diameter of the valve cavity 22 and the inner periphery of which defines an inlet 30, which has a partial conical section that tapers inwardly in the direction of the inlet port 24 to the outlet port 25 and a cylindrical section having a plurality of metering orifices 32 disposed about its circumference.

The inlet 30 leads to a spring cavity 34, which houses a return spring 36, such as a coil spring, disposed about the shank of a coupler 38 and retained by a stop disk 40. By selecting a spring of proper rate and/or turns, a precise crack pressure can be selected, and since the proportioning valve 10 is flow pressure actuated and spring returned, the operational characteristics of the proportioning valve 10 can thus be adjusted and set by spring selection. More or less pre-loading can be applied to the return spring 36 by positioning the stop disk 40, allowing for tuning adjustment of the proportioning valve 10 without changing the return spring 36. Moreover, the stop disk 40 serves to isolate the return spring 36 from the main flow path, thereby eliminating spring resonance interaction with the flowing media.

The coupler 38 can be a threaded bolt that threads into a threaded opening in the metering member, in this case a poppet valve 42. The coupler 38 retains the poppet valve 42 to the valve guide 26 but allows for relative movement therebetween. The poppet valve 42 has an inverted spool construction with a circular tapered metering edge 44 that angles inwardly in the direction of the inlet port 24. The tapered metering edge 44 shears across the metered flow stream, and thereby makes the poppet valve 42 essentially insensitive to flow forces.

Figure 4:
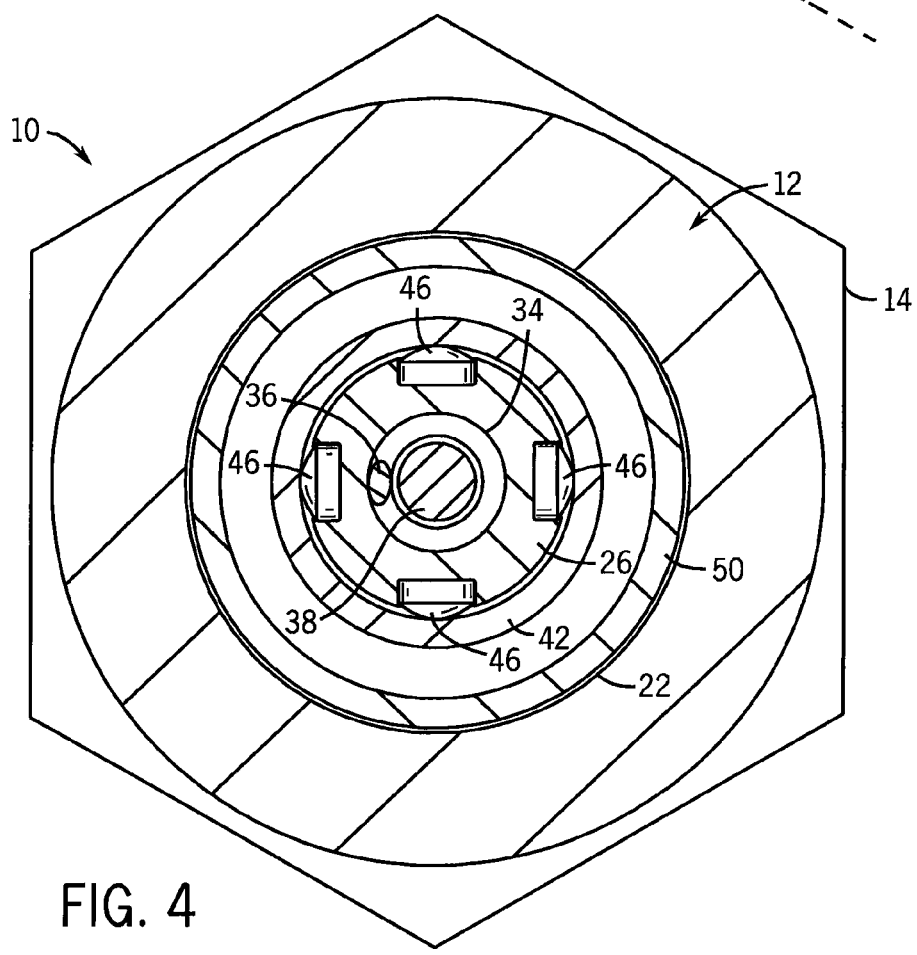
FIG. 4 is an enlarged sectional view taken along line 4-4 of FIG. 2 showing the sliding point interface between the poppet valve and its guide.

As shown in FIGS. 2 and 4, the poppet valve 42 slides with respect to the valve guide 26. Two sets of four buttons 46 disposed in pockets at the 3, 6, 9 and 12 o'clock positions of the valve guide 26 have convex, preferably spherical, mating surfaces that make point contact with the inner diameter of the poppet valve 42. The buttons 46 are preferably made of a non-ferrous alloy material, such as a suitable plastic or plastic composite. The material and point contact of the buttons 46 reduce particle contamination by eliminating metal-to-metal contact between the poppet valve 42 and the valve guide 26 as well as by maximizing clearance therebetween and eliminating sliding surface or line contact. The valve guide 26 also includes a circumferential groove for a two-piece piston ring and expander set 48.

A sleeve 50 fits just inside of the inner diameter of the valve cavity 22. One end of the sleeve 50 abuts a seal retainer 52 that captures a seal 54 disposed about the periphery of the valve guide 26 just downstream from the nose 28. A retainer nut 56 threads into the opening of the outlet port 25. The retainer nut 56 can be tool-tightened to secure the valve internals inside the valve housing 12. The retainer nut 56 has a open core 58 that forms part of the flow path.

When the poppet valve 42 is in the position shown in FIG. 2, the metering orifices 32 are blocked so that flow is prevented to the outlet port 18. FIG. 3 shows the flow path the flowing media takes through the proportioning valve 10. Fluid flow from the inlet line 16 and enters the proportioning valve 10 via inlet port 24. The flow first expands and then funnels into the inlet 30 of the valve guide 26. At some threshold crack pressure, the pressure forces of the flowing media overcome the counteracting force of the return spring 36, which causes the poppet valve 42 to slide axially toward the outlet port 18 and thereby open the metering orifices 32. The metering edge 44 of the poppet valve 42 changes position with respect to the metering orifices 32 to deliver from the outlet port 25 pressurized fluid from the inlet port 24 in proportion to a pressure drop across the proportioning valve 10 between the inlet 24 and outlet 25 ports. In the disclosed configuration, the circular metering edge 44 is at essentially the same position with respect to each orifice, and thus each orifice is opened the same amount so that flow is essentially equal through each. Since the metering orifices are spaced angularly about the valve guide 26, the flow forces on the poppet valve 42 are essentially evenly distributed. The flowing media turns 90 degrees radially from the valve axis 20 and then turns 90 degrees axially to flow along the outside of the poppet valve 42 and straight on through to the outlet port 25 and the outlet line 18. This flow path thus follows a smooth contour, which minimizes parasitic pressure losses and pockets in the flow path where contamination can build up.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

I claim:

1. A fluid proportioning valve, the valve comprising:
   a valve housing having an inlet port, an outlet port and a valve cavity between the inlet and outlet ports;
   a valve guide disposed in the valve cavity and having an inlet in communication with the inlet port of the valve housing and an orifice in communication with the inlet, the valve guide defining a spring cavity;
   a spring disposed in the spring cavity;
   a retaining ring disposed in the spring cavity against which the spring acts;
   a metering valve disposed in the valve cavity about the valve guide, the metering valve having a metering edge controlling flow through the valve guide orifice; and
   a coupler having a cylindrical body and enlarged head joining the metering valve to the valve guide so as to permit relative movement of the metering valve with respect to the valve guide along a valve axis, wherein the coupler captures the retaining ring and the spring within the spring cavity;
   whereby the metering edge of the metering valve changes position with respect to the valve guide orifice to deliver from the outlet port pressurized fluid from the inlet port in proportion to a pressure drop between the inlet and outlet ports.

2. The valve of claim 1, wherein the valve guide defines a plurality of the orifices in communication with the valve guide inlet.

3. The valve of claim 2, wherein the valve orifices are spaced apart along a circumference of the valve guide.

4. The valve of claim 3, wherein the metering valve is an annular valve having a circular metering edge.

5. The valve of claim 1, wherein the coupler is threaded to the metering valve.

6. The valve of claim 1, wherein the spring is disposed about the coupler.

7. The valve of claim 1, wherein the valve guide includes an enlarged section mating with an interior surface of the valve housing defining the valve cavity so that the valve guide extends along the valve axis.

8. A fluid proportioning valve, the valve comprising:
   a valve housing having an inlet port, an outlet port and a valve cavity between the inlet and outlet ports;
   a valve guide disposed in the valve cavity and having an inlet in communication with the inlet port of the valve housing and an orifice in communication with the inlet, the valve guide defining a spring cavity;
   a spring disposed in the spring cavity;
   a metering valve disposed in the valve cavity about the valve guide, the metering valve having a metering edge controlling flow through the valve guide orifice;
   a coupler joining the metering valve to the valve guide so as to permit relative movement of the metering valve with respect to the valve guide along a valve axis; and
   a retaining sleeve and a retaining nut for applying retaining force to secure the valve guide within the valve housing;
   whereby the metering edge of the metering valve changes position with respect to the valve guide orifice to deliver from the outlet port pressurized fluid from the inlet port in proportion to a pressure drop between the inlet and outlet orts.

9. The valve of claim 8, wherein the valve nut has an axial passageway in communication with the valve cavity and the outlet port.

10. A fluid proportioning valve, the valve comprising:
    a valve housing having an inlet port, an outlet port and a valve cavity between the inlet and outlet ports;
    a valve guide disposed in the valve cavity and having an inlet in communication with the inlet port of the valve housing and a plurality of orifices disposed about a circumference of the valve guide in communication with the inlet, the valve guide defining a spring cavity;
    a spring disposed in the spring cavity;
    a retaining ring disposed in the spring cavity against which the spring acts;
    a poppet metering valve disposed in the valve cavity about the valve guide, the metering valve having a circular metering edge controlling flow from the valve guide orifice; and
    a coupler having a cylindrical body and enlarged head joining the metering valve to the valve guide so as to permit relative movement of the metering valve with respect to the valve guide along a valve axis, wherein the coupler captures the retaining ring and the spring within the spring cavity;
    whereby the metering edge of the metering valve changes position with respect to the valve guide orifice to deliver from the outlet port pressurized fluid from the inlet port in proportion to a pressure drop between the inlet and outlet ports.

11. The valve of claim 10, wherein the coupler is threaded to the metering valve.

12. The valve of claim 10, wherein the spring is disposed about the coupler.

13. The valve of claim 10, wherein the valve guide includes an enlarged section mating with an interior surface of the valve housing defining the valve cavity so that the valve guide extends along the valve axis.

14. A fluid proportioning valve, the valve comprising:
    a valve housing having an inlet port, an outlet port and a valve cavity between the inlet and outlet ports;
    a valve guide disposed in the valve cavity and having an inlet in communication with the inlet port of the valve housing and a plurality of orifices disposed about a circumference of the valve guide in communication with the inlet, the valve guide defining a spring cavity;
    a spring disposed in the spring cavity;
    a poppet metering valve disposed in the valve cavity about the valve guide, the metering valve having a circular metering edge controlling flow from the valve guide orifice;
    a coupler joining the metering valve to the valve guide so as to permit relative movement of the metering valve with respect to the valve guide along a valve axis; and
    a retaining sleeve and a retaining nut for applying retaining force to secure the valve guide within the valve housing
    whereby the metering edge of the metering valve changes position with respect to the valve guide orifice to deliver from the outlet port pressurized fluid from the inlet port in proportion to a pressure drop between the inlet and outlet ports.

15. The valve of claim 14, wherein the valve nut has an axial passageway in communication with the valve cavity and the outlet port.

* * * * *

UNITED STATES PATENT AND TRADEMARK OFFICE
CERTIFICATE OF CORRECTION

PATENT NO. : 7,464,722 B2 Page 1 of 1
APPLICATION NO. : 11/462926
DATED : December 16, 2008
INVENTOR(S) : Harvey B. Jansen It is certified that error appears in the above-identified patent and that said Letters Patent is hereby corrected as shown below:

Claim 8, Col. 5, Line 67 change "orts" to --ports--.

Signed and Sealed this

Twelfth Day of May, 2009

JOHN DOLL
*Acting Director of the United States Patent and Trademark Office*